United States Patent
Hotta et al.

(10) Patent No.: US 8,223,614 B2
(45) Date of Patent: Jul. 17, 2012

(54) METHOD OF MANUFACTURING SYNTHETIC RESIN LENS, METHOD OF MANUFACTURING REFORMED SYNTHETIC RESIN MATERIAL AND OPTICAL PICKUP APPARATUS

(75) Inventors: Tohru Hotta, Okaya (JP); Ryoichi Kawasaki, Isesaki (JP); Hiroyuki Ichikawa, Hanno (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 332 days.

(21) Appl. No.: 12/468,758

(22) Filed: May 19, 2009

(65) Prior Publication Data

US 2009/0252022 A1    Oct. 8, 2009

Related U.S. Application Data

(63) Continuation of application No. PCT/JP2008/063033, filed on Jul. 18, 2008.

(30) Foreign Application Priority Data

Jul. 20, 2007   (JP) .................................. 2007-189276
Jul. 11, 2008   (JP) .................................. 2008-181569

(51) Int. Cl.
   *G11B 7/00*       (2006.01)

(52) U.S. Cl. .................................. 369/112.23; 264/1.38
(58) Field of Classification Search ............. 369/112.01, 369/112.23; 264/1.37, 1.38; 359/355, 361, 359/642, 719
See application file for complete search history.

(56) References Cited

U.S. PATENT DOCUMENTS

| | | | | |
|---|---|---|---|---|
| 5,638,206 | A  * | 6/1997 | Sumiya et al. | 359/368 |
| 6,083,429 | A  * | 7/2000 | Wester | 264/1.38 |
| 7,110,342 | B2 * | 9/2006 | Nishino et al. | 369/112.01 |
| 7,261,845 | B2 * | 8/2007 | Itoh et al. | 264/1.1 |
| 2005/0264900 | A1* | 12/2005 | Ishida et al. | 359/811 |
| 2007/0048489 | A1* | 3/2007 | Nakamura et al. | 428/64.4 |
| 2007/0105702 | A1* | 5/2007 | Matsumoto et al. | 501/50 |
| 2008/0285422 | A1* | 11/2008 | Taka | 369/112.23 |

FOREIGN PATENT DOCUMENTS

| | | |
|---|---|---|
| JP | 2005-338684 | 12/2005 |
| JP | 2006-188623 | 7/2006 |
| JP | 2006-233122 | 9/2006 |
| JP | 2007-119567 | 5/2007 |

* cited by examiner

*Primary Examiner* — Thomas Alunkal
(74) *Attorney, Agent, or Firm* — SoCal IP Law Group LLP; Steven C. Sereboff; John E. Gunther

(57) ABSTRACT

A method of manufacturing a synthetic resin lens, comprising: adjusting a degree of change in transmittance of a lens member made of synthetic resin for a blue violet laser beam with accumulated application of the blue violet laser beam, by applying to the lens member an electromagnetic wave shorter in wavelength than the blue violet laser beam.

24 Claims, 3 Drawing Sheets

(12) United States Patent

METHOD OF MANUFACTURING SYNTHETIC RESIN LENS, METHOD OF MANUFACTURING REFORMED SYNTHETIC RESIN MATERIAL AND OPTICAL PICKUP APPARATUS

CROSS-REFERENCE TO RELATED APPLICATIONS

This is a continuation application of International Patent Application No. PCT/JP2008/063033 filed Jul. 18, 2008, which claims the benefit of priority to Japanese Patent Application Nos. 2007-189276 and 2008-181569, filed Jul. 20, 2007 and Jul. 11, 2008, respectively. The full contents of the International Patent Application are incorporated herein by reference.

BACKGROUND OF THE INVENTION

1. Field of the Invention

The present invention relates to a synthetic resin lens such as an objective lens used in an optical pickup apparatus performing an operation of reading signals recorded in an optical disc and an operation of recording signals into an optical disc, and a material of a synthetic resin lens.

2. Description of the Related Art

An optical disc apparatus is widely used which is capable of applying a laser beam emitted from an optical pickup apparatus to a signal recording layer of an optical disc to perform a signal reading operation and a signal recording operation.

While an optical disc apparatus using an optical disc called CD or DVD is generally used, there is recently developed an optical disc apparatus using an optical disc with improved record density, i.e., the optical disc of the Blu-ray standard or HD DVD standard (High Definition Digital Versatile Disc).

Infrared light with a wavelength of 780 nm is used as the laser beam for the operation of reading signals recorded in a CD-standard optical disc, and red light with a wavelength of 650 nm is used as the laser beam for the operation of reading signals recorded in a DVD-standard optical disc.

A protective layer provided on a top surface of the signal recording layer of the CD-standard optical disc has a thickness of 1.2 mm, and a numerical aperture of an objective lens used for the operation of reading signals from the signal recording layer is set to a specified value of 0.45. The protective layer provided on the top surface of the signal recording layer of the DVD-standard optical disc has a thickness of 0.6 mm, and the numerical aperture of the objective lens used for the operation of reading signals from the signal recording layer is set to the specified value of 0.6.

There is used the laser beam with a shorter wavelength, for example, blue-violet light with a wavelength of 405 nm as the laser beam for the operation of reading signals recorded in the Blu-ray and HD-DVD-standard optical discs, as compared to the CD-standard and DVD-standard optical discs.

The protective layer provided on the top surface of the signal recording layer of the Blu-ray standard optical disc has a thickness of 0.1 mm, and the numerical aperture of the objective lens used for the operation reading signals from the signal recording layer is set to the specified value of 0.85.

It is required to reduce a diameter of a laser spot generated by focusing a laser beam for reproduction of signals recorded in the signal recording layer of the Blu-ray standard optical disc and for recording signals in the signal recording layer. The objective lens used for obtaining a desired laser spot shape has not only an increased numerical aperture (NA) but also a reduced focal distance, and therefore, a curvature radius of the objective lens is reduced.

An optical pickup apparatus includes a laser diode emitting the laser beam with a wavelength corresponding to the above standards and an objective lens focusing the laser beam emitted from the laser diode onto the signal recording layer of the optical discs. Although glass is generally used as a material of the objective lens, synthetic resin has recently been often used so as to produce inexpensively. (see Japanese Patent Application Laid-Open Publication No. 2005-338684.)

Although a price of an optical pickup apparatus can be reduced by using the objective lens made of synthetic resin, synthetic resin has a distinctive feature that characteristics are changed corresponding to a wavelength of the laser beam to be used. When an objective lens for focusing the laser beam corresponding to the Blu-ray standard and the HD-DVD standard, i.e., a blue-violet laser beam with a wavelength of 405 nm is made of synthetic resin, which is used for the objective lens for focusing the laser beam corresponding to the DVD standard, i.e., a red laser beam with a wavelength of 650 nm, for example, synthetic resin called APEL 5014DP of Mitsui Chemicals, inc., transmittance of the objective lens is reduced by the blue-violet laser beam.

FIG. 4 is a characteristic view showing change in transmittance with time in the case of using the objective lens, as it is, which is made of the above synthetic resin called APEL 5014DP and applying the blue-violet laser beam with a wavelength of 405 nm. It is experimentally confirmed that a change in the transmittance of the objective lens with time according to the application time is greater than such specifications applicable to the objective lens as to satisfy optical performance of the optical pickup apparatus. That is, it is confirmed that the above change exceeds the predetermined range of 2%, which is set for the case of 1000-hour application of the blue-violet laser beam having a wavelength of 405 nm, so that the transmittance is reduced to go out of the predetermined range, which is based on specifications applicable to the objective lens.

As the transmittance of the objective lens is reduced as above, intensity of the laser beam focused on the surface of the signal recording layer of the optical disc is reduced, and thus, reproducing and recording operations cannot normally be performed for signals recorded in the optical disc. Although synthetic resin, which is unaffected by the blue-violet laser beam, for example, synthetic resin called ZEONEX 340R of Zeon Corporation, is used as a material of the objective lens to solve such problem, this synthetic resin is expensive as compared to the material used for the objective lens for DVD, which cause a problem that the price of the optical pickup apparatus cannot be reduced.

SUMMARY OF THE INVENTION

A method of manufacturing a synthetic resin lens according to an aspect of the present invention, comprises: adjusting a degree of change in transmittance of a lens member made of synthetic resin for a blue violet laser beam with accumulated application of the blue violet laser beam, by applying to the lens member an electromagnetic wave shorter in wavelength than the blue violet laser beam.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

A method of manufacturing a synthetic resin lens according to an embodiment of the present invention includes adjusting a degree of change in transmittance of a lens member for a blue violet laser beam with accumulated application of the blue violet laser beam (for example, making the degree of the change smaller as compared to a degree of change in the transmittance of the lens member before applied with the following electromagnetic wave), by applying the electromagnetic wave (such as violet light, ultraviolet light, X ray, and gamma ray) having a wavelength shorter than the blue violet laser beam to the lens member made of synthetic resin.

A method of manufacturing a reformed synthetic resin material according to an embodiment of the present invention includes adjusting a degree of change in transmittance of a synthetic resin material for a blue violet laser beam with accumulated application of the blue violet laser beam (for example, making the degree of the change smaller as compared to a degree of change in the transmittance of the synthetic resin material before applied with a following electromagnetic wave), by applying an electromagnetic wave (such as violet light, ultraviolet light, X ray, and gamma ray).

According to an embodiment of the present invention, a synthetic resin material (for example, a relatively inexpensive synthetic resin material such as the APEL 5014DP) can be used as an objective lens material for the blue violet laser beam as well (for example, an alternative material to a relatively expensive synthetic resin material such as the ZEONEX 340R), although it could not practically be used as an objective lens material for the blue violet laser beam though widely used as an objective lens material for the red laser beam, since a degree of reduction in transmittance of the synthetic resin for the blue violet laser beam with accumulated application of the blue violet laser beam is great while a degree of reduction in the transmittance thereof for the red laser beam with accumulated application of the red laser beam is small.

With the implementation of an embodiment of the present invention, although the transmittance for the blue violet laser beam right after application of the electromagnetic wave may be reduced as compared to that before application of the electromagnetic wave, this is not too great a problem in itself practically as a objective lens for the blue violet laser beam, and it becomes rather a great advantage practically as the objective lens for the blue violet laser beam that the degree of change in transmittance for the blue violet laser beam with accumulated application of the blue violet laser beam becomes small.

Figure 1:
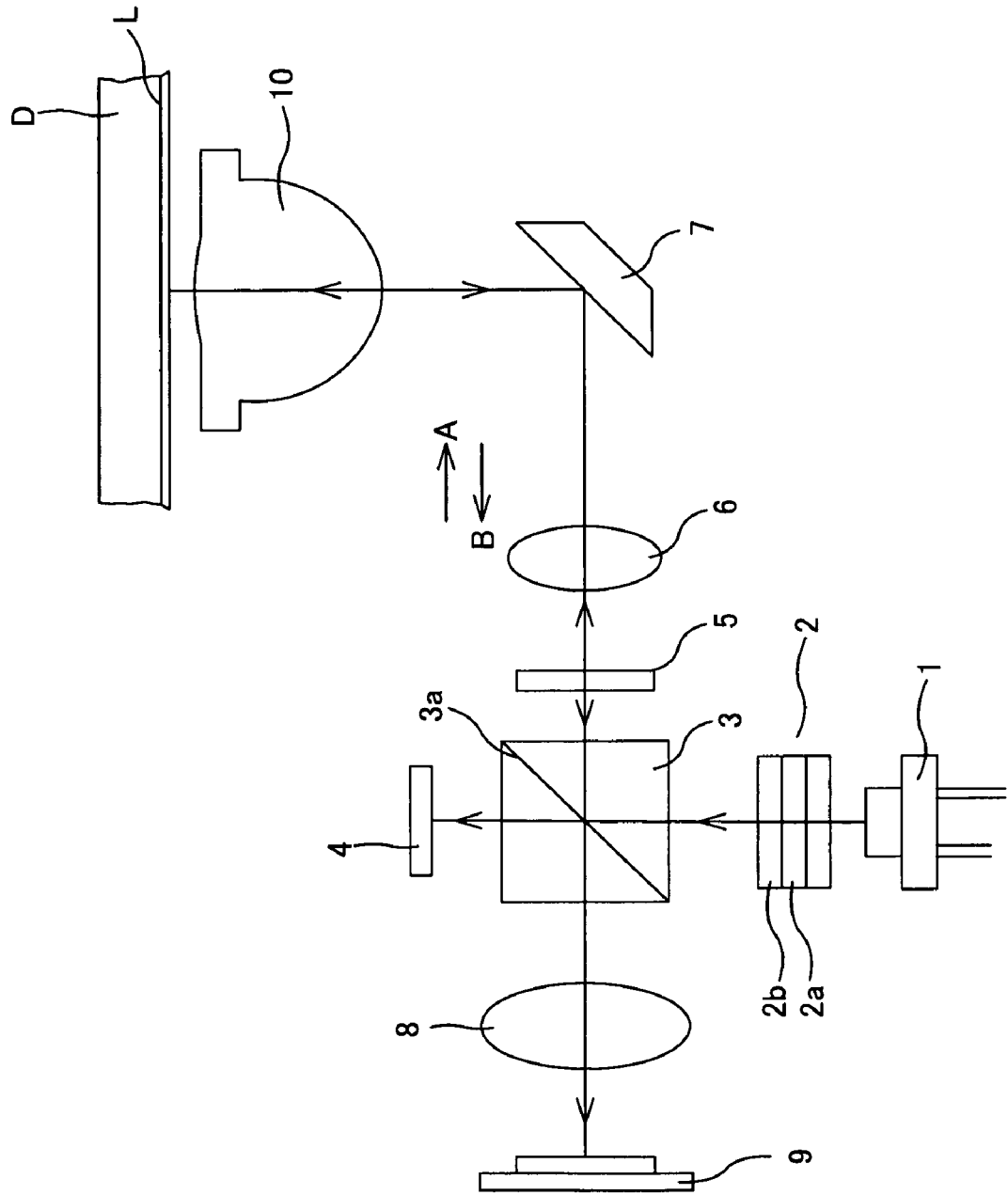
FIG. 1 is a schematic configuration view showing an optical pickup apparatus using a synthetic resin lens according to one embodiment of the present invention as an objective lens.

In FIG. 1, reference numeral 1 denotes a laser diode emitting a blue-violet laser beam with a wavelength of 405 nm, for example, and reference numeral 2 denotes a diffraction grating that the laser beam emitted from the laser diode 1 enters and is made up of a diffraction grating portion 2a, which splits the laser beam into a main beam of 0th order light and subbeams of +1st order diffracted light and −1st diffracted order light, and a half-wave plate 2b which converts incident laser light into linear polarized light in the S direction.

Reference numeral 3 denotes a polarizing beam splitter that the laser beam having passed through the diffraction grating 2 enters and that is provided with a control film reflecting an S-polarized laser beam and allowing a laser beam polarized in the P-direction to pass therethrough. Reference numeral 4 denotes a monitoring photodetector disposed at a position where the laser beam emitted from the laser diode 1 and having passing through the polarizing beam splitter 3 is applied, and the detection output thereof is used to control output of the laser beam to be emitted from the laser diode 1.

Reference numeral 5 denotes a quarter-wave plate that is disposed at a position where the laser beam reflected by the control film 3a of the polarizing beam splitter 3 is applied, and that converts the incident laser beam from the linear polarized light into circular polarized light. Reference numeral 6 denotes a collimating lens that the laser beam having passed through the quarter-wave plate 5 enters, that converts the incident laser beam into parallel light, and that corrects spherical aberration due to a protective layer of a Blu-ray standard optical disc D.

Reference numeral 7 denotes a reflection mirror that the laser beam having converted into parallel light by the collimating lens 6 enters and reflects the laser beam, and that return light reflected from a signal recording layer L of the optical disc D enters and reflects the return light in a direction of the polarizing beam splitter 3, which will be described later.

Reference numeral 8 denotes a sensor lens that the return light having passed through the control film 3a included in the polarizing beam splitter 3 enters, and that has a cylindrical face, a flat face, a concave curved face or a convex curved face, etc., formed on the incident surface side and the emitting surface side. Such sensor lens 8 is provided for generating astigmatism in the return light to generate a focus error signal to be used for a focus control operation. Reference numeral 9 denotes a photodetector disposed at a position where the return light having passed through the sensor lens 8 is focused and applied, and that is made up of a four-divided sensor or the like including arrayed photodiodes. A configuration of such photodetector 9, an operation of generating the focus error signal using an astigmatic method, etc., are well known and will be omitted.

Reference numeral 10 denotes an objective lens that the laser beam reflected by the reflection mirror 7 enters, that focuses the incident laser beam on the signal recording layer L included in the optical disc D. The objective lens is manufactured by forming of synthetic resin and is designed such that a curvature radius is reduced unlike a spherical surface.

When the reproducing operation is performed for signals recorded in the optical disc, a drive current is supplied to the laser diode 1 and the laser diode 1 emits the laser beam with a wavelength of 405 nm from the laser diode 1. The laser beam emitted from the laser diode 1 is made incident on the diffraction grating 2, to be divided into 0th order light, +1st order diffracted light, and −1st order diffracted light by the diffraction grating portion 2a making up the diffraction grating 2 and converted into the linear polarized light in the S direction by the half-wave plate 2b. The laser beam having passed through the diffraction grating 2 is made incident on the polarizing beam splitter 3 to be reflected by the control film 3a included in the polarizing beam splitter 3, and a portion of the incident laser beam passes through the control film 3a to be applied to the monitoring photodetector 4.

The laser beam reflected by the control film 3a is made incident on the collimating lens 6 through the quarter-wave plate 5 to be converted into the parallel light due to an effect of the collimating lens 6. The laser beam having converted into the parallel light by the collimating lens 6 is reflected by the reflection mirror 7 to be made incident on the objective lens 10. The laser beam made incident on the objective lens 10 is applied as a spot to the signal recording layer L of the optical disc D through the focusing operation of the objective lens 10. The laser beam emitted from the laser diode 1 is applied as a desired spot to the signal recording layer L of the optical disc D, and the numerical aperture of the objective lens 10 is set at 0.85 in this case.

Although spherical aberration is generated due to a difference in thickness of a protective layer between the signal recording layer L and the signal incident surface of the optical disc D when the above focusing operation of the laser beam is performed by the objective lens 10, an adjustment can be made by displacing the collimating lens 6 described in an embodiment in a light-axis direction, i.e., a direction of an arrow A or B so as to minimize this spherical aberration.

The operation is performed by the above operation to apply the laser beam emitted from the laser diode 1 to the signal recording layer L included in the optical disc D through the focusing operation of the objective lens 10, and when the applying operation is performed, the return light reflected from the signal recording layer L is made incident on the objective lens 10 from the side of the optical disc D. The return light made incident on the objective lens 10 enters the polarizing beam splitter 3 through the reflection mirror 7, the collimating lens 6, and the quarter-wave plate 5. Since the return light made incident on the polarizing beam splitter 3 is converted into the linear polarized light in the P direction, the return light passes through the control film 3a included in the polarizing beam splitter 3.

The return light of the laser beam having passed through the control film 3a is made incident on the sensor lens 8, and astigmatism is generated due to the effect of the sensor lens 8. The return light in which the astigmatism is generated due to the sensor lens 8 is applied to a sensor portion of a four-divided sensor etc., included in the photodetector 9 through the focusing operation of the sensor lens 8. As a result of applying the return light to the photodetector 9 in this way, the focus-error signal generating operation is performed, as is well known, with the use of a change in a spot shape of the main beam applied to the sensor portion included in the photodetector 9. The focus control operation can be performed by displacing the objective lens 10 toward a signal surface of the optical disc D with the use of such focus error signal.

Although not described in an embodiment according to the present invention, a configuration is configured such that the well known tracking control operation can be performed with the use of the +1st order light and −1st order light, i.e., the sub-beams generated by the diffraction grating 2, and thus a reading operation is performed for signals recorded in the optical disc D by performing such control operation.

Although the reading operation for the signals recorded in the optical disc D is performed as above, since a portion of the laser beam is applied to the monitoring photodetector 4 when the reading operation is performed, the monitor signal obtained from the monitoring photodetector 4 can be utilized for controlling a value of the drive current supplied to the laser diode 1.

Since the output of the laser beam can be controlled by controlling the value of the drive current supplied to the laser diode 1, an adjustment operation can be performed for the laser output required not only for the reading operation of signals recorded on the optical disc D but also a recording operation of signals into the optical disc D.

While the signal reproducing operation, etc., are performed in the optical pickup apparatus having a configuration shown in FIG. 1 as described above, a manufacturing method of the objective lens 10 will hereinafter be described, according to a gist of an embodiment of the present invention.

The objective lens 10 according to an embodiment of the present invention is manufactured by being formed of the synthetic resin material, for example, cyclic olefin polymer resin such as the above APEL 5014DP, and such material is the same as a material used for the objective lens for performing the focusing operation of the first wavelength laser beam such as the red laser beam with a wavelength of 650 nm corresponding to the DVD-standard optical discs, for example.

An operation of applying ultraviolet light with a wavelength of 360 nm emitted from an ultraviolet light irradiation device such as a mercury xenon lamp is performed for the entire objective lens formed of such synthetic resin material. The time of application of ultraviolet light for such objective lens is, for example, about 50 minutes, and it is confirmed that such applying operation reduces the initial transmittance of the objective lens to about 95.7% for the blue-violet laser beam, i.e., the laser beam with a wavelength of 405 nm.

Figure 2:
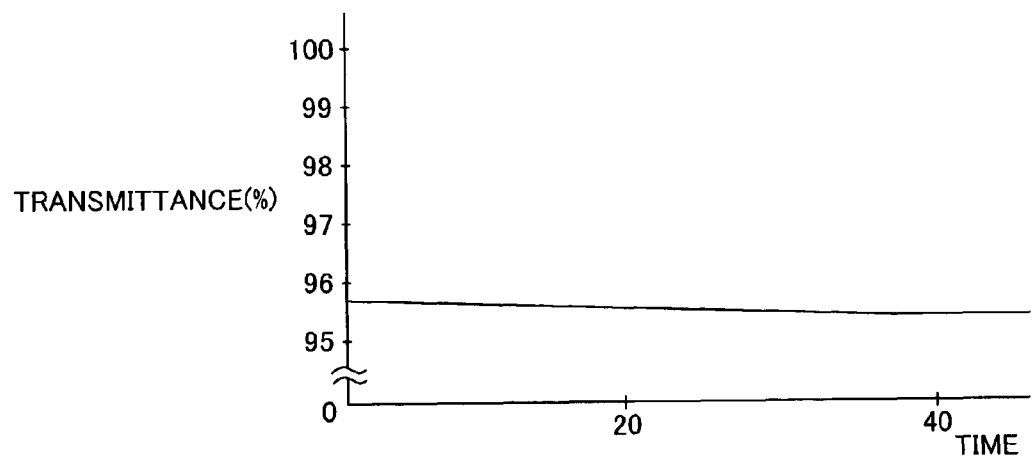
FIG. 2 is a characteristic view showing a relationship between transmittance of a synthetic resin lens and time according to one embodiment of the present invention.

FIG. 2 shows a relationship between the application time and the transmittance when the blue-violet laser beam, i.e., the laser beam with a wavelength of 405 nm is applied to the objective lens having the transmittance reduced to be set at about 95.7% with the above method, i.e., by applying ultraviolet light with a wavelength of 360 nm emitted from a mercury xenon lamp. As seen from such a characteristic view, the transmittance is stable at 95.3% after about 40 hours has elapsed, and it is experimentally confirmed that a change in the transmittance of the objective lens applied with the blue-violet laser beam having a wavelength of 405 nm for 1000 hours can be restrained within a range of about 1%. That is, there can be considerably reduced a rate of the change in the transmittance of the objective lens with time for the blue-violet laser beam after the ultraviolet light is applied from the ultraviolet light irradiation device.

As described above, by irradiating the objective lens formed of the cyclic olefin polymer resin with the ultraviolet light from the ultraviolet light irradiation device, the change in the transmittance of the objective lens with time can be set within 2% for the case of 1000-hour application of the blue-violet laser beam having a wavelength of 405 nm, i.e., within a range specified as such specifications as to satisfy optical performance. Therefore, by applying the ultraviolet light to the objective lens formed of the same material as that used for the objective lens for performing the focusing operation of the red laser beam with a wavelength of 650 nm corresponding to the DVD-standard optical discs, the objective lens can be used without trouble as an objective lens focusing, onto the signal recording layer L of the optical disc D, the blue-violet laser beam, i.e., the laser beam with a wavelength of 405 nm used for performing the reproducing and recording operations for signals recorded in the Blu-ray standard optical disc D.

Figure 3:
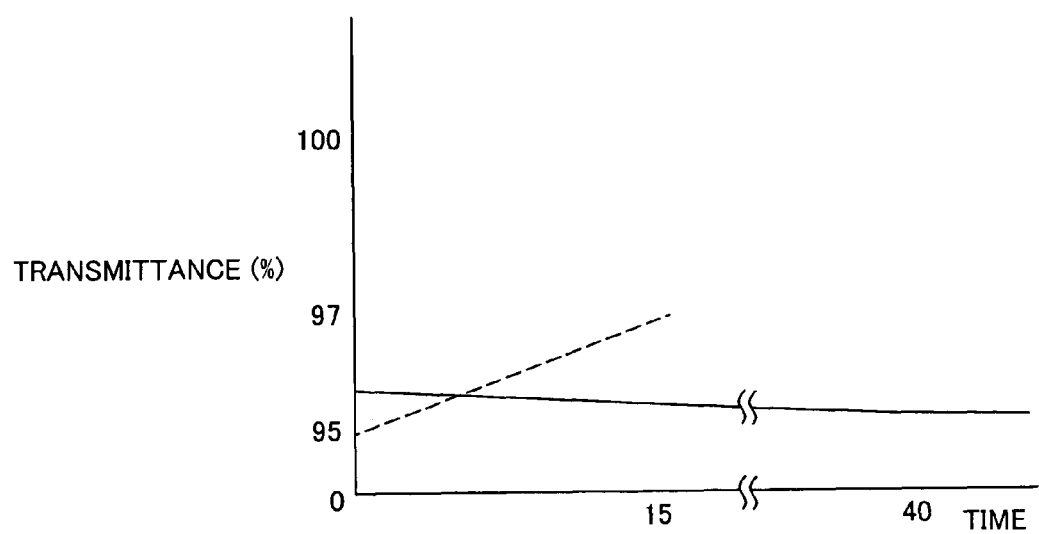
FIG. 3 is a characteristic view for explaining a manufacturing method of a synthetic resin lens according to one embodiment of the present invention.
Figure 4:
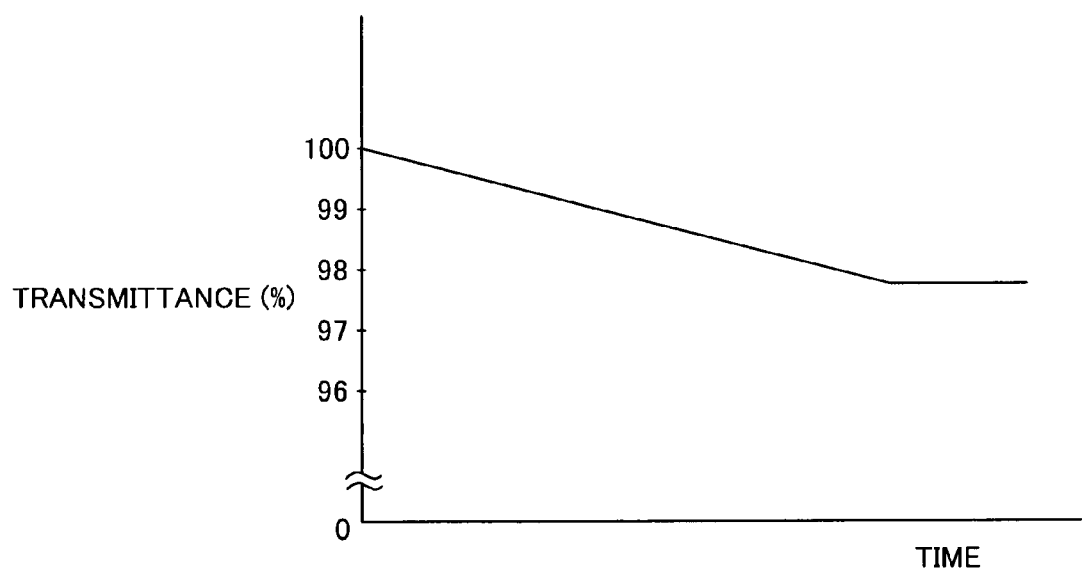
FIG. 4 is a characteristic view of a relationship between transmittance of a synthetic resin lens and time

FIG. 3 shows a relationship between the application time and the transmittance when the blue-violet laser beam with a wavelength of 405 nm is applied to the objective lens for a different application time of the ultraviolet light emitted from a mercury xenon lamp. In FIG. 3, a transmittance of 100% indicates a transmittance of the blue-violet laser beam with a wavelength of 405 nm when no ultraviolet light is applied to the objective lens formed of the synthetic resin material same as the material used for the objective lens for performing the focusing operation of the red laser beam with a wavelength of 650 nm.

In FIG. 3, a characteristic indicated by a solid line represents a change in the transmittance of the objective lens after applying the ultraviolet light with a wavelength of 360 nm emitted from a mercury xenon lamp for about 50 minutes, as described above. It is known from this characteristic that the initial transmittance of the objective lens is reduced to be set at about 95.7% by the application of the ultraviolet light and that the transmittance of the objective lens is reduced to be stabilized at 95.3% after applying the blue-violet laser beam for 40 hours.

In FIG. 3, a characteristic indicated by a broken line represents a change in the transmittance of the objective lens after applying the ultraviolet light with a wavelength of 360 nm emitted from a mercury xenon lamp for about 7 minutes. It is known from this characteristic that the initial transmittance of the objective lens is reduced to be set at about 95% by the application of the ultraviolet light and that the transmittance of the objective lens is increased up to 97% after a lapse of 15 hours of the application time of the blue-violet laser beam. That is, since the transmittance of the objective lens applied with the ultraviolet light for about 7 minutes is changed by 2% or more in accordance with the application time of the blue-violet laser beam, it may become a problem to use such objective lens as the objective lens of the optical pickup apparatus.

The transmittance of the objective lens for the blue-violet laser beam is changed corresponding to the application condition of the ultraviolet light as described above, and an initial setting value and variation characteristics of the transmittance can be set to various values by adjusting the application time of the ultraviolet light. That is, in an embodiment described above, the application time of the ultraviolet light is set at about 50 minutes, and the initial transmittance of the objective lens for the laser beam with a wavelength of 405 nm is set at about 95.7%. In an embodiment described above, a transmittance setting operation is performed by applying to the objective lens the ultraviolet light emitted from a mercury xenon lamp, and such mercury xenon lamp has a characteristic that spectral intensity and width are great and a spectrum including an emission line group is broad in the ultraviolet region. Therefore, it is required to perform an applying operation with accuracy in order to obtain a highly accurate objective lens.

The initial transmittance of the objective lens can be set at a desired value by applying the ultraviolet light generated from the ultraviolet light irradiation device as above to the objective lens formed of synthetic resin for a predetermined time, and the initial transmittance can be set based on the intensity and the application time of the ultraviolet light. That is, since the application time is considerably changed in accordance with a radiant heat quantity of the ultraviolet light applied to the objective lens, after applying the ultraviolet light from the ultraviolet light irradiation device, the intensity and the application time of the ultraviolet light is appropriately set so as to reduce considerably the rate of the change in the transmittance of the objective lens with time for the blue-violet laser beam, and thus, the transmittance of the objective lens can be set within a range of desired transmittances.

While the transmission characteristics of the objective lens formed of synthetic resin for the blue-violet laser beam are changed by applying the ultraviolet light generated from the ultraviolet irradiation device, since there is frequently employed a method by which the objective lens in the optical pickup apparatus is adhesively fixed to a member called a lens holder (not shown) with an ultraviolet curing adhesive, if the ultraviolet light applied when performing such an adhesive fixing operation is applied to the objective lens, the adhesive fixing operation and a transmittance changing operation can advantageously be performed at a time.

The lens holder is elastically supported so as to be movable with respect to an actuator frame fixed to a housing of the optical pickup apparatus so that the focus control operation and the tracking control operation can be performed with the laser beam applied to the optical disc by moving the objective lens.

When comparing refractive indexes between APEL 5014DP used as a material of the objective lens 10 of an embodiment according to the present invention and ZEONEX 340R that is the synthetic resin material suitable for the blue-violet laser beam, the refractive indexes of APEL 5014DP and ZEONEX 340R are 1.5434 and 1.509, respectively, for the d-line (laser beam with a wavelength of 587.6 nm, which is an emission line of a Na-lamp light source) at 25 degrees Celsius, and the refractive indexes thereof for the blue-violet laser beam with a wavelength of 405 nm are 1.5575 and 1.5215, respectively.

In this way, it can be seen that APEL 5014DP used as the synthetic resin material for the objective lens for DVD using the red laser beam, i.e., the synthetic resin material used as the material of the objective lens according to an embodiment of the present invention is greater in refractive index than the synthetic resin material used for the objective lens for the blue-violet laser beam. Therefore, since the objective lens manufactured according to an embodiment of the present invention has a greater refractive index, a curvature radius of the objective lens can be increased, and thus an embodiment according to the present invention achieves a highly advantageous effect when manufacturing an objective lens of an optical pickup apparatus requiring a short-focus objective lens.

While the transmittance is changed by applying the ultraviolet light to the objective lens made of synthetic resin in an embodiment according to the present invention, the collimating lens 6 and the sensor lens 8 making up an optical system of the optical pickup apparatus shown in FIG. 1 can be formed of synthetic resin to be configured such that the transmittances can be changed by applying the ultraviolet light generated from the ultraviolet light irradiation device to the collimating lens 6 and the sensor lens 8.

Moreover, the ultraviolet light is used in order to change the transmittance of the synthetic resin lens for the blue violet laser beam in an embodiment of the present invention, however, instead of the ultraviolet light, an electromagnetic wave with a wavelength shorter than the blue violet laser beam, such as violet light, X ray, and gamma ray, can be used depending on the degree of difficulty of adjusting the application time and application intensity.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A method of manufacturing a synthetic resin lens, comprising:
adjusting a degree of change in transmittance of a lens member made of synthetic resin for a blue violet laser beam with accumulated application of the blue violet laser beam by applying to the lens member an electromagnetic wave shorter in wavelength than the blue violet laser beam, the electromagnetic wave applied to the lens member for a predetermined application time and intensity, the predetermined application time and intensity set such that a range of a change in transmittance of the lens member for the blue violet laser beam is adjusted within 2% when the blue violet laser beam is applied to the lens member for 1000 hours.

2. A method of manufacturing a synthetic resin lens, comprising:
making smaller a degree of reduction in transmittance of a lens member made of synthetic resin for a blue violet laser beam with accumulated application of the blue violet laser beam by applying to the lens member an electromagnetic wave shorter in wavelength than the blue violet laser beam, as compared to a degree of reduction in transmittance of the lens member before applied with the electromagnetic wave, the electromagnetic wave applied to the lens member for a predetermined application time and intensity, the predetermined application time and intensity set such that a range of a change in transmittance of the lens member for the blue violet laser beam is adjusted within 2% when the blue violet laser beam is applied to the lens member for 1000 hours.

3. A method of manufacturing a synthetic resin lens, comprising:
adjusting a degree of change in transmittance of a lens member made of synthetic resin for a blue violet laser beam with accumulated application of the blue violet laser beam by applying an electromagnetic wave shorter in wavelength than the blue violet laser beam to the lens member whose degree of reduction in transmittance for the blue violet laser beam with accumulated application of the blue violet laser beam is greater than a degree of reduction in transmittance of the lens member for a red laser beam with accumulated application of the red laser beam, the electromagnetic wave applied to the lens member for a predetermined application time and intensity, the predetermined application time and intensity set such that a range of a change in transmittance of the lens member for the blue violet laser beam is adjusted within 2% when the blue violet laser beam is applied to the lens member for 1000 hours.

4. A method of manufacturing a synthetic resin lens, comprising:
bringing a degree of reduction in transmittance of a lens member made of synthetic resin for a blue violet laser beam with accumulated application of the blue violet laser beam close to a degree of reduction in transmittance of the lens member for a red laser beam with accumulated application of the red laser beam by applying an electromagnetic wave shorter in wavelength than the blue violet laser beam to the lens member whose degree of reduction in transmittance for the blue violet laser beam with accumulated application of the blue violet laser beam is greater than a degree of reduction in transmittance of the lens member for a red laser beam with accumulated application of the red laser beam, the electromagnetic wave applied to the lens member for a predetermined application time and intensity, the predetermined application time and intensity set such that a range of a change in transmittance of the lens member for the blue violet laser beam is adjusted within 2% when the blue violet laser beam is applied to the lens member for 1000 hours.

5. A method of manufacturing a synthetic resin lens, comprising:
adjusting a degree of change in transmittance of a lens member made of synthetic resin for a blue violet laser beam with accumulated application of the blue violet laser beam by applying to the lens member an electromagnetic wave shorter in wavelength than the blue violet laser beam, the synthetic resin having a refractive index for d-line equal to 1.52 or greater at an environmental temperature of 25 degrees Celsius, the electromagnetic wave applied to the lens member for a predetermined application time and intensity, the predetermined application time and intensity set such that a range of a change in transmittance of the lens member for the blue violet laser beam is adjusted within 2% when the blue violet laser beam is applied to the lens member for 1000 hours.

6. A method of manufacturing a synthetic resin lens, comprising:
making smaller a degree of reduction in transmittance of a lens member made of synthetic resin for a blue violet laser beam with accumulated application of the blue violet laser beam by applying to the lens member an electromagnetic wave shorter in wavelength than the blue violet laser beam, as compared to a degree of reduction in transmittance of the lens member before applied with the electromagnetic wave, the synthetic resin having a refractive index for d-line equal to 1.52 or greater at an environmental temperature of 25 degrees Celsius, the electromagnetic wave applied to the lens member for a predetermined application time and intensity, the predetermined application time and intensity set such that a range of a change in transmittance of the lens member for the blue violet laser beam is adjusted within 2% when the blue violet laser beam is applied to the lens member for 1000 hours.

7. The method of manufacturing the synthetic resin lens according to claim 1, wherein
the lens member is bonded to a lens holder with an ultraviolet curing adhesive, and ultraviolet light is applied to the lens member as well when the ultraviolet light is applied to the ultraviolet curing adhesive.

8. The method of manufacturing the synthetic resin lens according to claim 2, wherein
the lens member is bonded to a lens holder with an ultraviolet curing adhesive, and ultraviolet light is applied to the lens member as well when the ultraviolet light is applied to the ultraviolet curing adhesive.

9. The method of manufacturing the synthetic resin lens according to claim 3, wherein
the lens member is bonded to a lens holder with an ultraviolet curing adhesive, and ultraviolet light is applied to the lens member as well when the ultraviolet light is applied to the ultraviolet curing adhesive.

10. The method of manufacturing the synthetic resin lens according to claim 4, wherein
the lens member is bonded to a lens holder with an ultraviolet curing adhesive, and ultraviolet light is applied to the lens member as well when the ultraviolet light is applied to the ultraviolet curing adhesive.

11. The method of manufacturing the synthetic resin lens according to claim 5, wherein
the lens member is bonded to a lens holder with an ultraviolet curing adhesive, and ultraviolet light is applied to the lens member as well when the ultraviolet light is applied to the ultraviolet curing adhesive.

12. The method of manufacturing the synthetic resin lens according to claim 6, wherein
the lens member is bonded to a lens holder with an ultraviolet curing adhesive, and ultraviolet light is applied to the lens member as well when the ultraviolet light is applied to the ultraviolet curing adhesive.

13. A method of manufacturing a reformed synthetic resin material, comprising:
adjusting a degree of change in transmittance of a synthetic resin material for a blue violet laser beam with accumulated application of the blue violet laser beam by applying to the synthetic resin material an electromagnetic wave shorter in wavelength than the blue violet laser beam, the electromagnetic wave applied to the synthetic resin material for a predetermined application time and intensity, the predetermined application time and intensity set such that a range of a change in transmittance of the synthetic resin material for the blue violet laser beam is adjusted within 2% when the blue violet laser beam is applied to the lens member for 1000 hours.

14. A method of manufacturing a reformed synthetic resin material, comprising:
making smaller a degree of change in transmittance of a synthetic resin material for a blue violet laser beam with accumulated application of the blue violet laser beam by applying to the synthetic resin material an electromagnetic wave shorter in wavelength than the blue violet laser beam, as compared to a degree of change in transmittance of the synthetic resin material before applied with the electromagnetic wave, the electromagnetic wave applied to the synthetic resin material for a predetermined application time and intensity, the predetermined application time and intensity set such that a range of a change in transmittance of the synthetic resin material for the blue violet laser beam is adjusted within 2% when the blue violet laser beam is applied to the lens member for 1000 hours.

15. A method of manufacturing a reformed synthetic resin material, comprising:
adjusting a degree of change in transmittance of a synthetic resin material for a blue violet laser beam with accumulated application of the blue violet laser beam by applying an electromagnetic wave shorter in wavelength than the blue violet laser beam to the synthetic resin material whose degree of reduction in transmittance for the blue violet laser beam with accumulated application of the blue violet laser beam is greater than a degree of reduction in transmittance of the lens member for a red laser beam with accumulated application of the red laser beam, the electromagnetic wave applied to the synthetic resin material for a predetermined application time and intensity, the predetermined application time and intensity set such that a range of a change in transmittance of the synthetic resin material for the blue violet laser beam is adjusted within 2% when the blue violet laser beam is applied to the lens member for 1000 hours.

16. A method of manufacturing a reformed synthetic resin material, comprising:
bringing a degree of change in transmittance of a synthetic resin material for a blue violet laser beam with accumulated application of the blue violet laser beam close to a degree of reduction in transmittance of the synthetic resin material for a red laser beam with accumulated application of the red laser beam by applying an electromagnetic wave shorter in wavelength than the blue violet laser beam to the synthetic resin material whose degree of reduction in transmittance for the blue violet laser beam with accumulated application of the blue violet laser beam is greater than a degree of reduction in transmittance of the lens member for a red laser beam with accumulated application of the red laser beam, the electromagnetic wave applied to the synthetic resin material for a predetermined application time and intensity, the predetermined application time and intensity set such that a range of a change in transmittance of the synthetic resin material for the blue violet laser beam is adjusted within 2% when the blue violet laser beam is applied to the lens member for 1000 hours.

17. A method of manufacturing a reformed synthetic resin material, comprising:
adjusting a degree of change in transmittance of a synthetic resin material for a blue violet laser beam with accumulated application of the blue violet laser beam by applying to the synthetic resin material an electromagnetic wave shorter in wavelength than the blue violet laser beam, the synthetic resin material having a refractive index for d-line equal to 1.52 or greater at an environmental temperature of 25 degrees Celsius, the electromagnetic wave applied to the synthetic resin material for a predetermined application time and intensity, the predetermined application time and intensity set such that a range of a change in transmittance of the synthetic resin material for the blue violet laser beam is adjusted within 2% when the blue violet laser beam is applied to the lens member for 1000 hours.

18. A method of manufacturing a reformed synthetic resin material, comprising:
making smaller a degree of change in transmittance of a synthetic resin material for a blue violet laser beam with accumulated application of the blue violet laser beam by applying to the synthetic resin material an electromagnetic wave shorter in wavelength than the blue violet laser beam, as compared to a degree of change in transmittance of the synthetic resin material before applied with the electromagnetic wave, the synthetic resin material having a refractive index for d-line equal to 1.52 or greater at an environmental temperature of 25 degrees Celsius, the electromagnetic wave applied to the synthetic resin material for a predetermined application time and intensity, the predetermined application time and intensity set such that a range of a change in transmittance of the synthetic resin material for the blue violet laser beam is adjusted within 2% when the blue violet laser beam is applied to the lens member for 1000 hours.

19. An optical pickup apparatus comprising:
a synthetic resin lens made by the manufacturing method according to claim 1 includes including an objective lens configured to focus a blue violet laser beam.

20. An optical pickup apparatus comprising:
a synthetic resin lens made by the manufacturing method according to claim 2 including an objective lens configured to focus a blue violet laser beam.

21. An optical pickup apparatus comprising:
a synthetic resin lens made by the manufacturing method according to claim 3 including an objective lens configured to focus a blue violet laser beam.

22. An optical pickup apparatus comprising:
a synthetic resin lens made by the manufacturing method according to claim 4 including an objective lens configured to focus a blue violet laser beam.

23. An optical pickup apparatus comprising:
a synthetic resin lens made by the manufacturing method according to claim 5 including an objective lens configured to focus a blue violet laser beam.

24. An optical pickup apparatus comprising:
a synthetic resin lens made by the manufacturing method according to claim 6 including an objective lens configured to focus a blue violet laser beam.

\* \* \* \* \*

UNITED STATES PATENT AND TRADEMARK OFFICE
CERTIFICATE OF CORRECTION

| | | |
|---|---|---|
| PATENT NO. | : 8,223,614 B2 | |
| APPLICATION NO. | : 12/468758 | |
| DATED | : July 17, 2012 | |
| INVENTOR(S) | : Tohru Hotta et al. | |

It is certified that error appears in the above-identified patent and that said Letters Patent is hereby corrected as shown below:

Column 12, line 57: delete "includes".

Signed and Sealed this
Fourth Day of September, 2012

David J. Kappos
*Director of the United States Patent and Trademark Office*